United States Patent
Ohtaki et al.

(10) Patent No.: US 6,993,093 B2
(45) Date of Patent: Jan. 31, 2006

(54) OFDM RECEIVING APPARATUS WITH REDUCED BIT ERROR RATE AFTER DEMODULATION

(75) Inventors: Yukio Ohtaki, Fukushima-ken (JP); Kazutoshi Kitada, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 246 days.

(21) Appl. No.: 10/383,987

(22) Filed: Mar. 7, 2003

(65) Prior Publication Data

US 2004/0125858 A1 Jul. 1, 2004

(30) Foreign Application Priority Data

Mar. 11, 2002 (JP) .............................. 2002-065481

(51) Int. Cl.
   *H04L 27/06* (2006.01)
   *H03H 7/30* (2006.01)
(52) U.S. Cl. ...................................... 375/316; 375/230
(58) Field of Classification Search ................ 375/229, 375/230, 232, 350, 347, 267, 316, 260, 343; 455/132–139; 370/260

See application file for complete search history.

(56) References Cited

U.S. PATENT DOCUMENTS

| 4,731,801 A | * | 3/1988 | Henriksson ................. 375/347 |
| 6,628,707 B2 | * | 9/2003 | Rafie et al. ................. 375/233 |
| 2004/0042569 A1 | * | 3/2004 | Casabona et al. ........... 375/346 |

FOREIGN PATENT DOCUMENTS

| EP | 1 093 268 A2 | 4/2001 |
| EP | 1 150 470 A2 | 10/2001 |
| JP | 11-17642 | 1/1999 |
| JP | 2001-313626 | 11/2001 |

* cited by examiner

*Primary Examiner*—Tesfaldet Bocure
(74) *Attorney, Agent, or Firm*—Brinks Hofer Gilson & Lione (57) ABSTRACT

A delay equalizing unit includes a delay time calculating unit for calculating a plurality of delay times which differ from each other by short time periods and which include the delay time of the delayed wave with respect to the direct wave, so that an OFDM-modulated signal input to path correlation detectors is delayed by the plurality of delay times. A feedback unit causes the amplitude and phase of the negatively fed back direct wave to coincide with the amplitude and phase of the delayed wave input to an adding unit based on the largest of the path correlations, so that the negatively fed back direct wave is delayed by a designated delay time based on which the largest path correlation is determined.

4 Claims, 7 Drawing Sheets

FIG. 9
PRIOR ART though the delayed wave has an amplitude similar to that of the direct wave, the sign of the amplitude is not reversed. Therefore, the sign of the real part (real-part autocorrelation signal) appears as shown in FIG. 2A, and the sign of the imaginary part (imaginary-part autocorrelation signal) in FIG. 2B. In FIGS. 2A and 2B, the horizontal axis represents the delay time and the vertical axis represents the amplitude. Therefore, the complex amplitude correcting unit 15b2 uses a coefficient having a plus sign.

OFDM RECEIVING APPARATUS WITH REDUCED BIT ERROR RATE AFTER DEMODULATION

This application claims the benefit of priority to Japanese Patent Application 2002-065481, filed on Mar. 11, 2002.

BACKGROUND OF THE INVENTION

1. Field of the Invention

The present invention relates to OFDM (Orthogonal Frequency Division Multiplexing) receiving apparatuses for receiving OFDM-modulated signals for use in terrestrial digital television broadcasts. In particular, the present invention relates to an OFDM receiving apparatus, suitable for on-board use in mobile units, in which delayed waves contained in an OFDM-modulated signal are removed to reduce the bit error rate after demodulation.

2. Description of the Related Art

Figure 7:
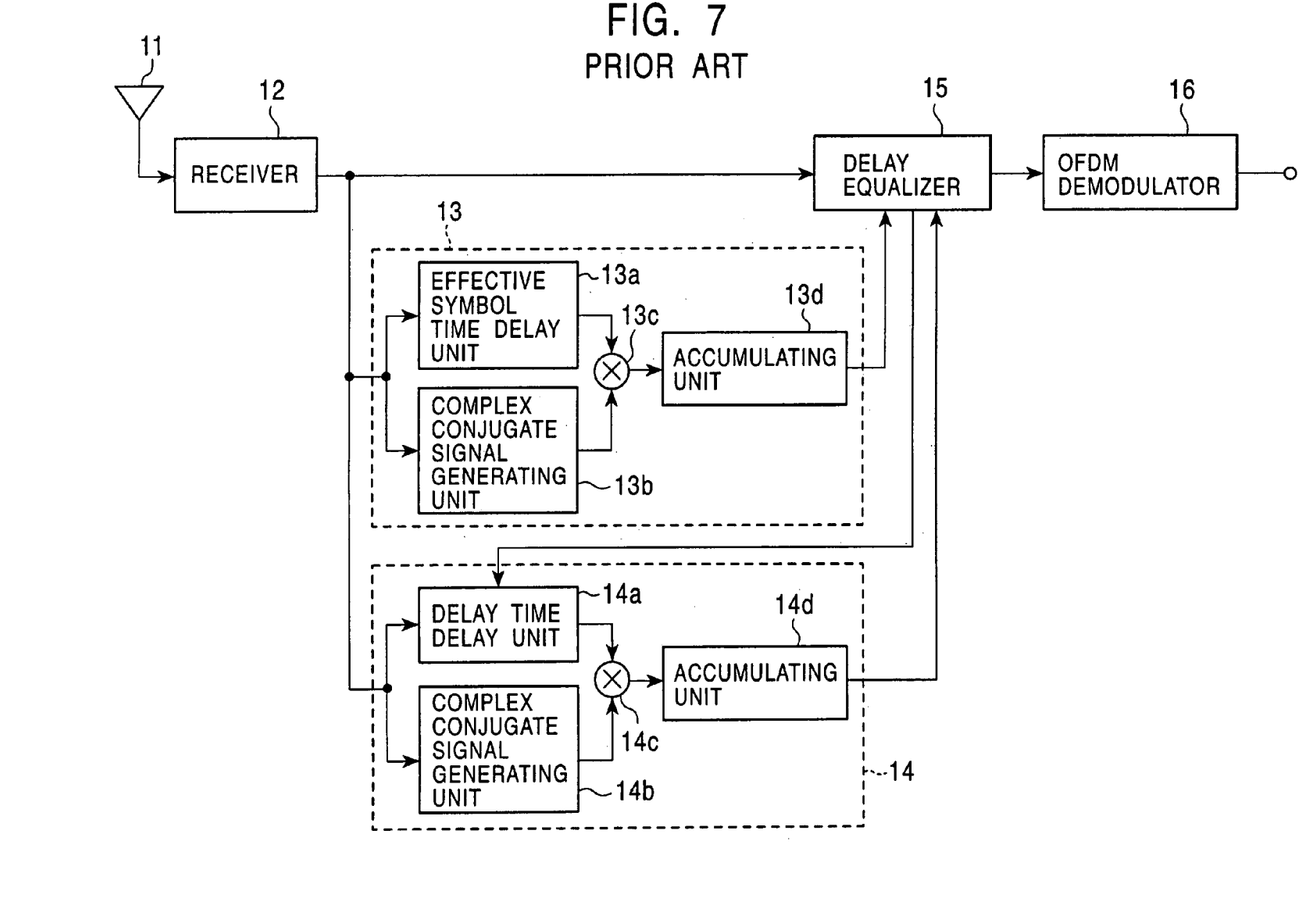
FIG. 7 is a circuit diagram of an OFDM receiving apparatus of the related art.
Figure 8:
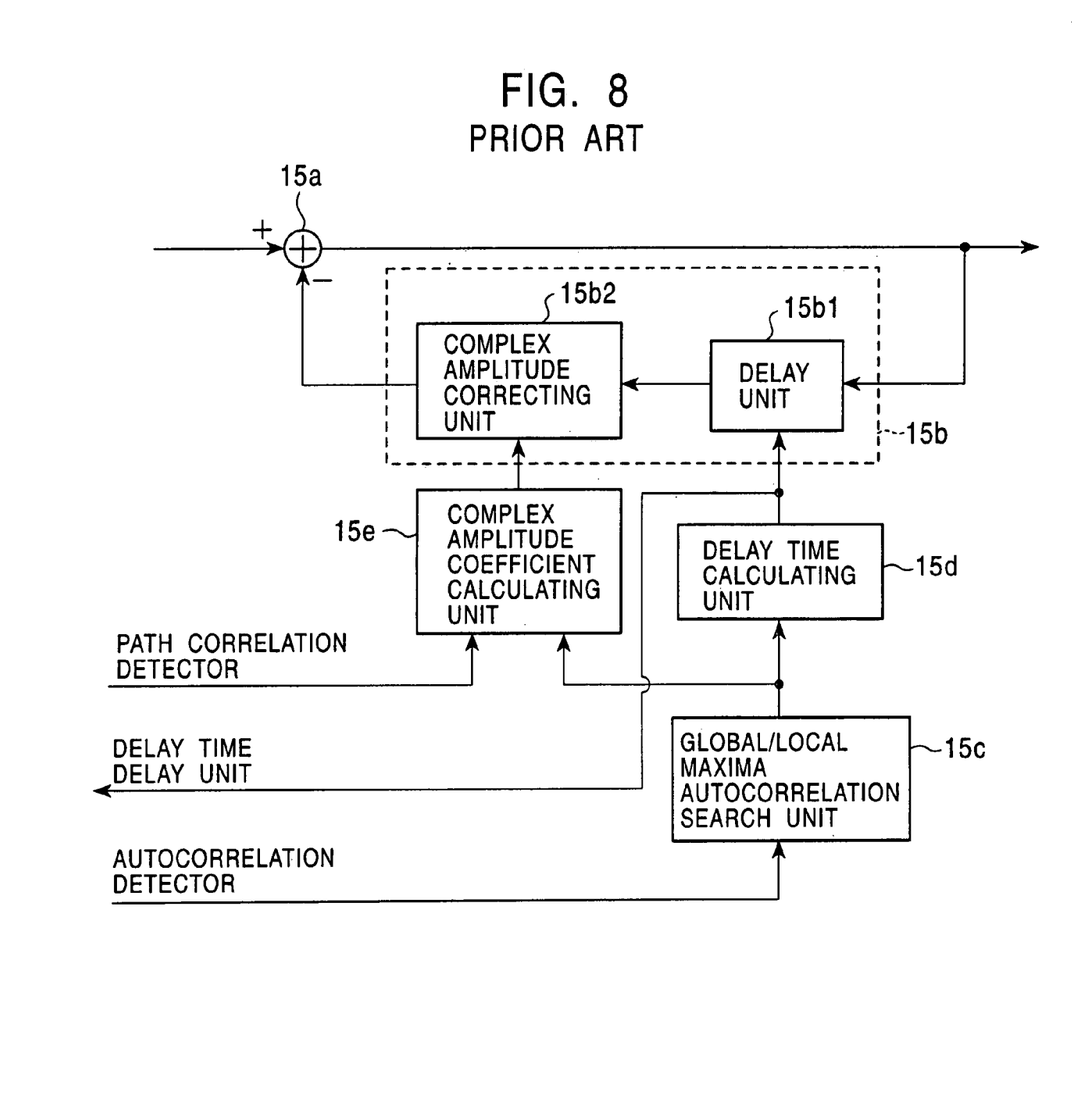
FIG. 8 is a circuit diagram of a delay equalizer in the OFDM receiving apparatus of the related art.

The structure and operation of an OFDM receiving apparatus of the related art are described below with reference to FIGS. 7 and 8. FIG. 7 illustrates the overall OFDM receiving apparatus, and FIG. 8 specifically illustrates a delay equalizer in the OFDM receiving apparatus shown in FIG. 7.

An OFDM-modulated signal received by an antenna 11 is amplified and frequency-converted in a receiver 12. The resulting signal is further converted into a pair of digital baseband signals, which stand in orthogonal relation to each other, by an analog-to digital (A/D) converter (not shown). It is assumed herein that the received OFDM signal contains a direct wave directly delivered from a transmission antenna, and a delayed wave delivered after being reflected by an obstruction such as a building, and the converted digital baseband signals also include a direct wave component and a delayed wave component. In the following description, however, the overall digital baseband signals are simply referred to as an "OFDM-modulated signal", unless specifically noted.

The OFDM-modulated signal output from the receiver 12 is input to an autocorrelation detector 13, a path correlation detector 14, and a delay equalizer 15.

One transmitted symbol of the OFDM-modulated signal is formed of a guard interval period in which it is tolerant of interference of the delayed waves, and an effective symbol period in which an information signal of interest to be transmitted is inserted.

The autocorrelation detector 13 detects the periodicity of the OFDM-modulated signal. For this purpose, the OFDM-modulated signal is input to both an effective symbol time delay unit 13a and a complex conjugate signal generating unit 13b. The effective symbol time delay unit 13a delays the input OFDM-modulated signal by the effective symbol period. The complex conjugate signal generating unit 13b generates a signal (complex conjugate signal) that is the conjugate of the input OFDM-modulated signal (one of the pair of orthogonal digital baseband signals is used as the real part and the other as the imaginary part). The OFDM-modulated signal delayed by the effective symbol time delay unit 13a and the complex conjugate signal generated by the complex conjugate signal generating unit 13b are multiplied by a multiplying unit 13c.

The multiplication results of the multiplying unit 13c are accumulated for a predetermined time by an accumulating unit 13d, and the value obtained as a result of accumulation is an autocorrelation signal which iterates every transmitted symbol. There are two types of autocorrelation signals, i.e., a real-part autocorrelation signal and an imaginary-part autocorrelation signal, as described above. The imaginary-part autocorrelation signal is significantly smaller and varies for one transmitted symbol period less than the real-part autocorrelation signal. The real-part autocorrelation signal exhibits some peaks for one transmitted symbol period of the OFDM-modulated signal, which are used to detect the periodicity of the OFDM-modulated signal. An autocorrelation peak (global maximum) that appears first corresponds to the amplitude of the direct wave, and an autocorrelation peak (local maximum) that appears later than the first peak corresponds to the amplitude of the delayed wave. A plurality of delayed waves produce a plurality of local maxima. Since the delayed wave arrives at the antenna 11 later than the direct wave, the delay time of the delayed wave with respect to the direct wave can be found based on the difference between the time when the global maximum appears and the time when the local maximum appears.

The path correlation detector 14 detects the phase difference between the direct wave and the delayed wave which is produced due to the difference in transmission route (path) therebetween. For this purpose, the OFDM-modulated signal is input to both a delay time delay unit 14a and a complex conjugate signal generating unit 14b. The delay time delay unit 14a delays the input OFDM-modulated signal by the delay time of the delayed wave with respect to the direct wave (the above-described delay time). The complex conjugate signal generating unit 14b generates a signal (complex conjugate signal) that is the conjugate of the input OFDM-modulated signal (one of the pair of orthogonal digital baseband signals is used as the real part and the other as the imaginary part). The complex conjugate signal generating unit 14b has the same structure as that of the complex conjugate signal generating unit 13b of the autocorrelation detector 13. The OFDM-modulated signal delayed by the delay time delay unit 14a and the complex conjugate signal generated by the complex conjugate signal generating unit 14b are multiplied by a multiplying unit 14c.

The multiplication results of the multiplying unit 14c are accumulated for a predetermined time by an accumulating unit 14d, and the value obtained as a result of accumulation is a path correlation signal. There are also two types of path correlation signals, i.e., a real-part path correlation signal and an imaginary-part path correlation signal, as described above. Both the real-part and imaginary-part path correlation signals exhibit a substantially constant path correlation value for one transmitted symbol period such that the arc tangent of mean path correlation value Ip for the real part and mean correlation value Qp for the imaginary part, i.e., arc tan Qp/Ip, represents the phase difference between the direct wave and the delayed wave.

When the delayed wave contained in the OFDM-modulated signal is delayed longer than the guard interval period (which has been inserted during modulation) in one transmitted symbol, the delay equalizer 15 removes the delayed wave and outputs only the direct wave. The structure of the delay equalizer 15 is shown in FIG. 8. The delay equalizer 15 includes an adding unit 15a having a first input terminal (+) to which the OFDM-modulated signal containing the delayed wave is input, and a feedback unit 15b connected between the output terminal of the adding unit 15a and a second input terminal (−) of the adding unit 15a. The feedback unit 15b has a delay unit 15b1 and a complex amplitude correcting unit 15b2.

The delay equalizer 15 further includes a global/local maxima autocorrelation search unit 15c to which the autocorrelation signal is input, and two calculating units, namely, a delay time calculating unit 15d and a complex amplitude coefficient calculating unit 15e, which are connected to the global/local maxima autocorrelation search unit 15c.

The global/local maxima autocorrelation search unit 15c searches for the times T1 and T2 at which the global and local maxima of the input autocorrelation signal appear (the global and local maxima may be the global and local maxima Ia and Ib with respect to the real-part autocorrelation signal, respectively), and sends a signal containing this information to the delay time calculating unit 15d. The delay time calculating unit 15d calculates the delay time (T2−T1) of the delayed wave based on the times T1 and T2, and sends a signal containing this information to the delay unit 15b1. The signal of the determined delay time (T2−T1) is also sent to the delay time delay unit 14a of the path correlation detector 14 to define the delay time thereof.

The delay unit 15b1 delays the OFDM-modulated signal output from the adding unit 15a, which substantially includes the direct wave alone with the delayed wave removed therefrom, by the delay time (T2−T1) of the delayed wave. The delay unit 15b1 then inputs the result to the complex amplitude correcting unit 15b2. Thus, the direct wave negatively fed back to the adding unit 15a coincides in time with the delayed wave of the OFDM-modulated signal initially input to the adding unit 15a.

The global/local maxima autocorrelation search unit 15c further searches for the global maximum Ia of the real-part autocorrelation signal and the global maximum Qa of the imaginary-part autocorrelation signal (which may be substituted for the mean values thereof), and sends the results to the complex amplitude coefficient calculating unit 15e.

Also input to the complex amplitude coefficient calculating unit 15e is the path correlation signal (real-part path correlation value Ip and imaginary-part path correlation value Qp) from the path correlation detector 14. The complex amplitude coefficient calculating unit 15e calculates a complex amplitude coefficient based on the above-noted four correlation values (Ia, Qa, Ip, and Qp). The complex amplitude correcting unit 15b2 uses the complex amplitude coefficient to correct the complex amplitude of the direct wave output from the delay unit 15b1 so as to coincide with the complex amplitude of the delayed wave of the OFDM-modulated signal input to the adding unit 15a.

Figure 9:
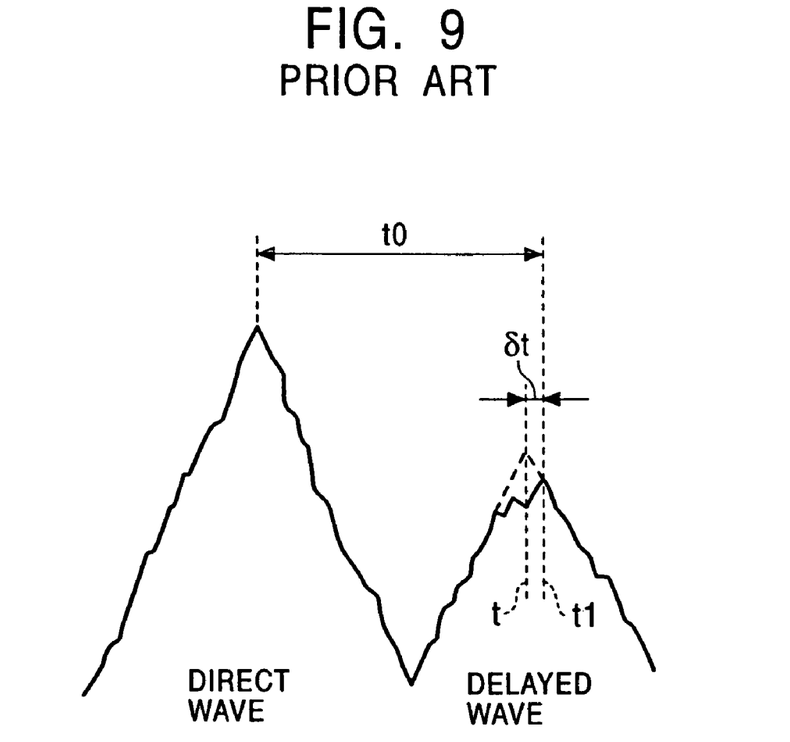
FIG. 9 is a waveform of an autocorrelation signal of the OFDM receiving apparatus of the related art.

As mentioned above, in the OFDM receiving apparatus of the related art, the delay time between the direct wave and delayed wave of the received OFDM-modulated signal is determined, and the complex amplitude of the fed back direct wave coincides with the complex amplitude of the delayed wave, thereby removing the delayed wave. However, noise superposed on the autocorrelation signal would cause a change of the time at which a low-level delayed wave peak (local maximum) appears, thus producing an error in the determined delay time to fail to determine the correct delay time. For example, as shown in FIG. 9, the peak, which must appear at time t for determining the delay time of the delayed wave, appears at time t1 due to superposition of noise, thus causing an error of difference δ between the obtained delay time t0 and the true delay time.

SUMMARY OF THE INVENTION

Accordingly, it is an object of the present invention to sufficiently remove a delayed wave if the delay time has an error due to noise superposed on an autocorrelation signal based on which the delay time is determined, thereby reducing the bit error rate after demodulation.

According to the present invention, an OFDM receiving apparatus includes a delay equalizing unit including an adding unit to which an OFDM-modulated signal including a direct wave and a delayed wave is input and a feedback unit for delaying the direct wave output from the adding unit and for negatively feeding back the delayed direct wave so as to remove the delayed wave; an autocorrelation detecting unit for detecting the amplitude of the direct wave and the amplitude of the delayed wave and for detecting the time at which each of the amplitudes becomes the local maximum; and a plurality of path correlation detecting units for delaying the input OFDM-modulated signal by different periods to detect a path correlation value indicating a phase difference between the direct wave and the delayed wave. The delay equalizing unit further includes a delay time calculating unit for calculating a plurality of delay times which differs from each other by short time periods based on the times at which the amplitudes become the local maximum, the plurality of delay times including the delay time of the delayed wave with respect to the direct wave, so as to delay the OFDM-modulated signal input to the path correlation detecting units by the plurality of delay times. The feedback unit causes the amplitude and phase of the negatively fed back direct wave to coincide with the amplitude and phase of the delayed wave input to the adding unit based on the largest path correlation value of the path correlation values so as to delay the negatively fed back direct wave by a designated delay time based on which the largest path correlation value is determined.

Therefore, if noise is superposed on an autocorrelation signal based on which the delay time is determined to produce an error in the obtained delay time, the largest autocorrelation value is used to completely remove the delayed wave.

The delay equalizing unit may further include a path correlation signal comparing unit for comparing the path correlation values; a path correlation signal selecting unit for selecting a path correlation signal corresponding to the largest path correlation value; and a time delay selecting unit for selecting the designated delay time. The path correlation signal comparing unit may control the selection of the path correlation signal selecting unit and the delay time selecting unit. Therefore, the largest path correlation value and the delay time from which the largest path correlation value is determined can be obtained.

The feedback unit may include a complex amplitude correcting unit for performing correction so that the amplitude and phase of the negatively fed back direct wave coincide with the amplitude and phase of the delayed wave input to the adding unit; and a delay unit for feeding back the negatively fed back direct wave by the designated delay time based on which the largest path correlation value is determined. Therefore, the amplitude and phase of the negatively fed back direct wave and the delay time can be defined.

The selected path correlation signal may be input to the delay equalizing unit. The delay equalizing unit may further include a complex amplitude coefficient calculating unit for causing the amplitude and phase of the negatively fed back direct wave to coincide with the amplitude and phase of the delayed wave input to the adding unit based on the amplitudes and the times. Thus, the complex amplitude coefficient calculating unit can readily correct the amplitude and phase of the direct wave using the complex amplitude coefficient.

DESCRIPTION OF THE PREFERRED EMBODIMENTS

Figure 1:
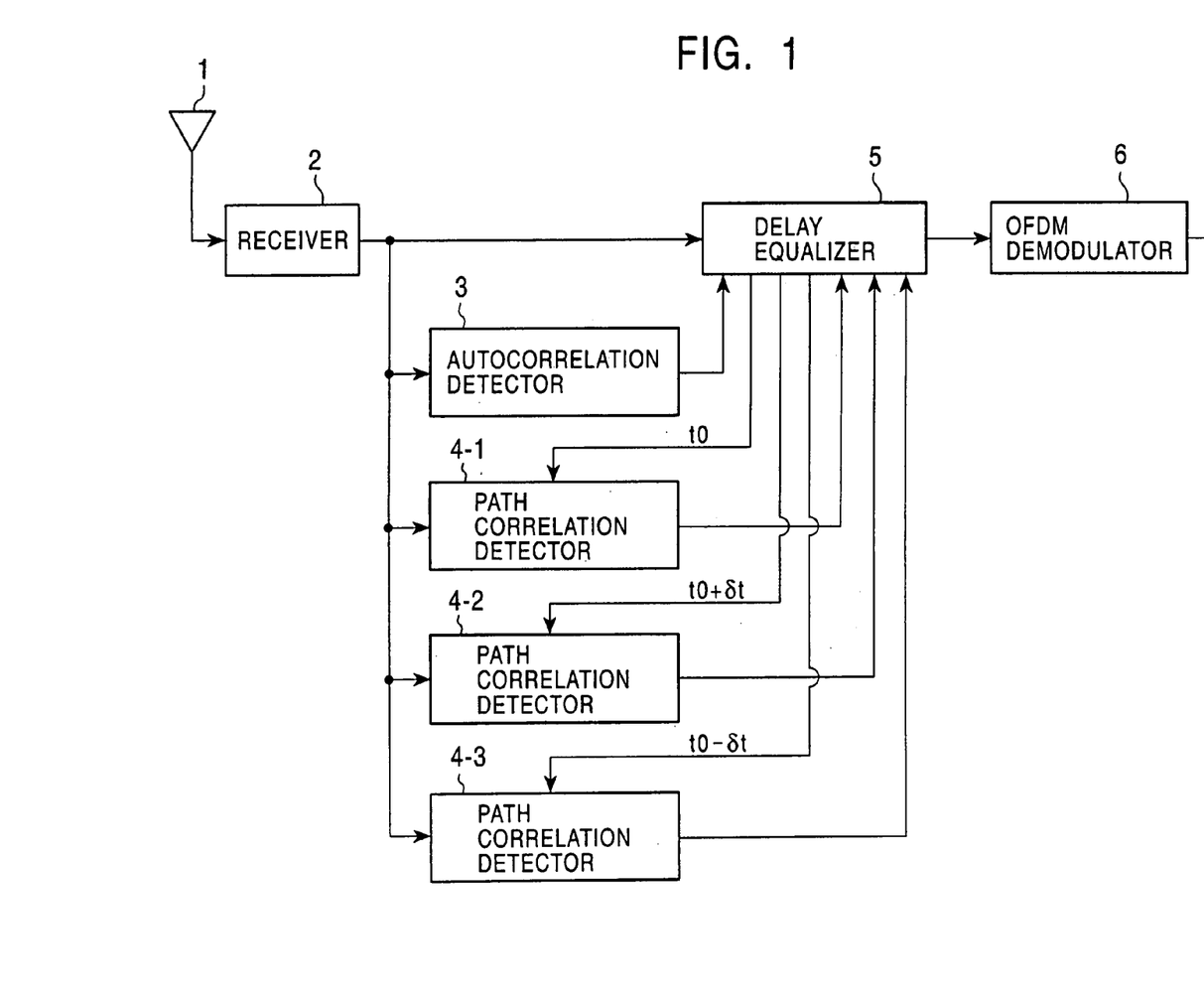
FIG. 1 is a circuit diagram of an OFDM receiving apparatus of the present invention.
Figure 2:
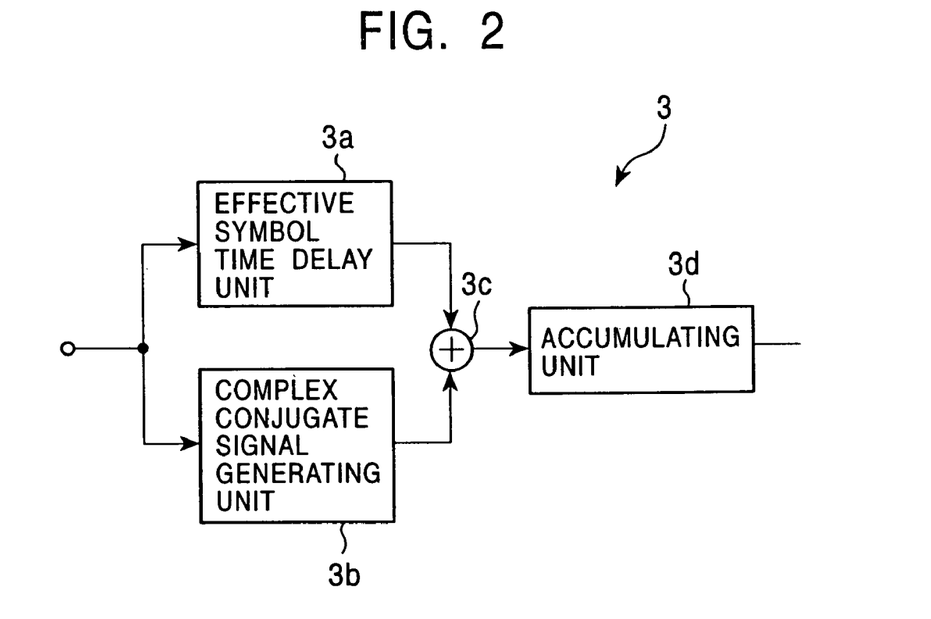
FIG. 2 is a circuit diagram of an autocorrelation detector in the OFDM receiving apparatus of the present invention.
Figure 3:
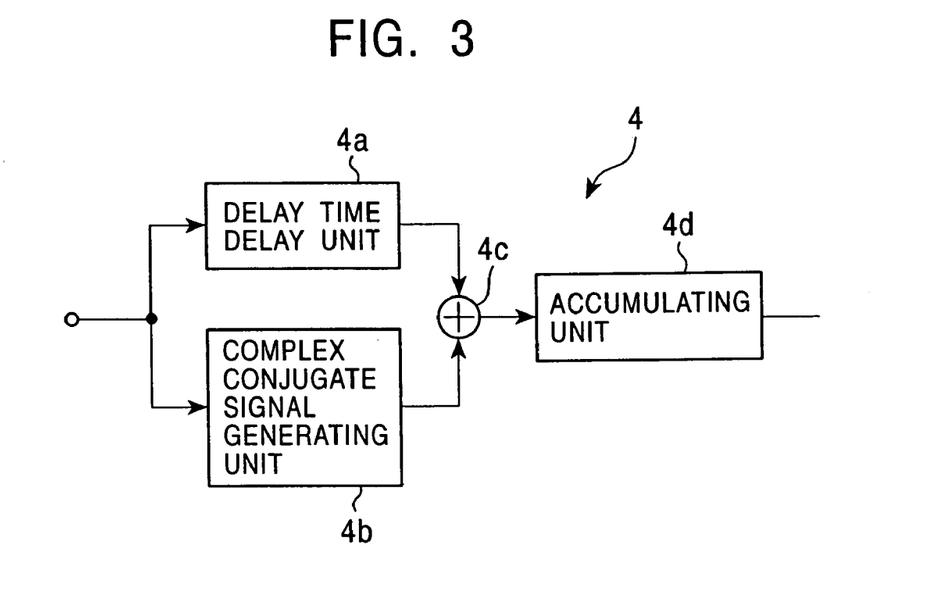
FIG. 3 is a circuit diagram of a path autocorrelation detector in the OFDM receiving apparatus of the present invention.
Figure 4:
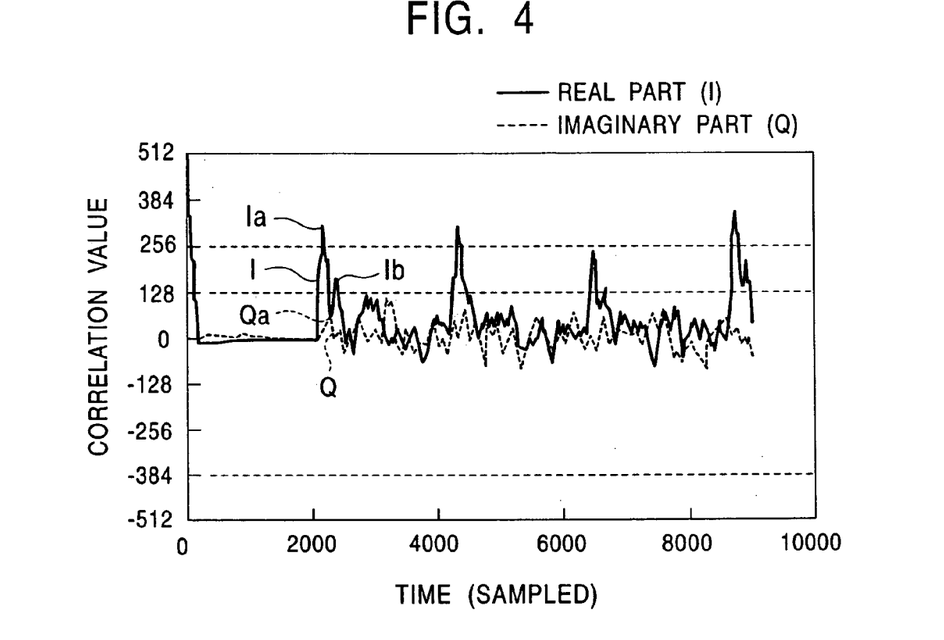
FIG. 4 is a waveform of an autocorrelation signal of the OFDM receiving apparatus of the present invention.
Figure 5:
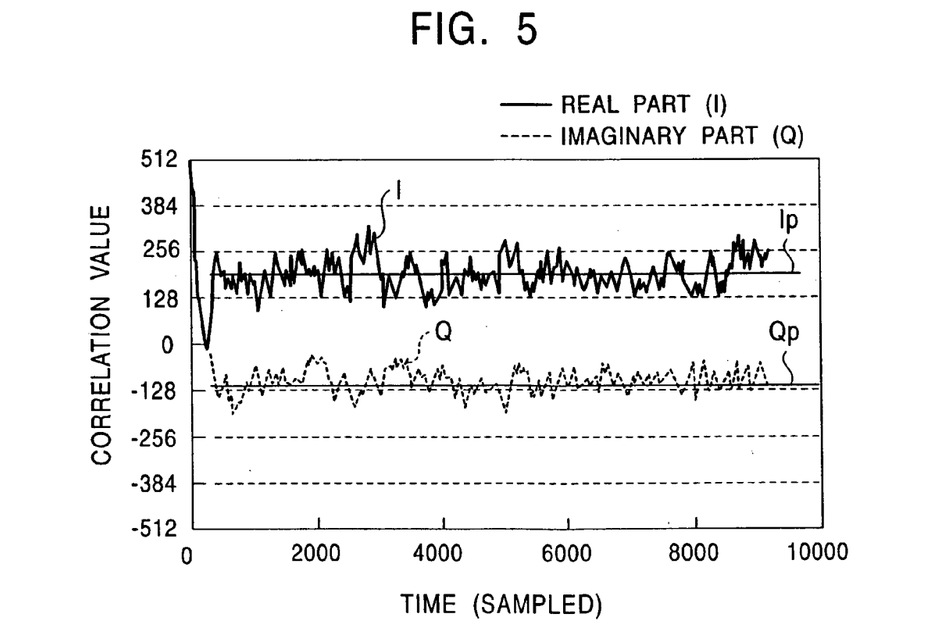
FIG. 5 is a waveform of a path signal of the OFDM receiving apparatus of the present invention.
Figure 6:
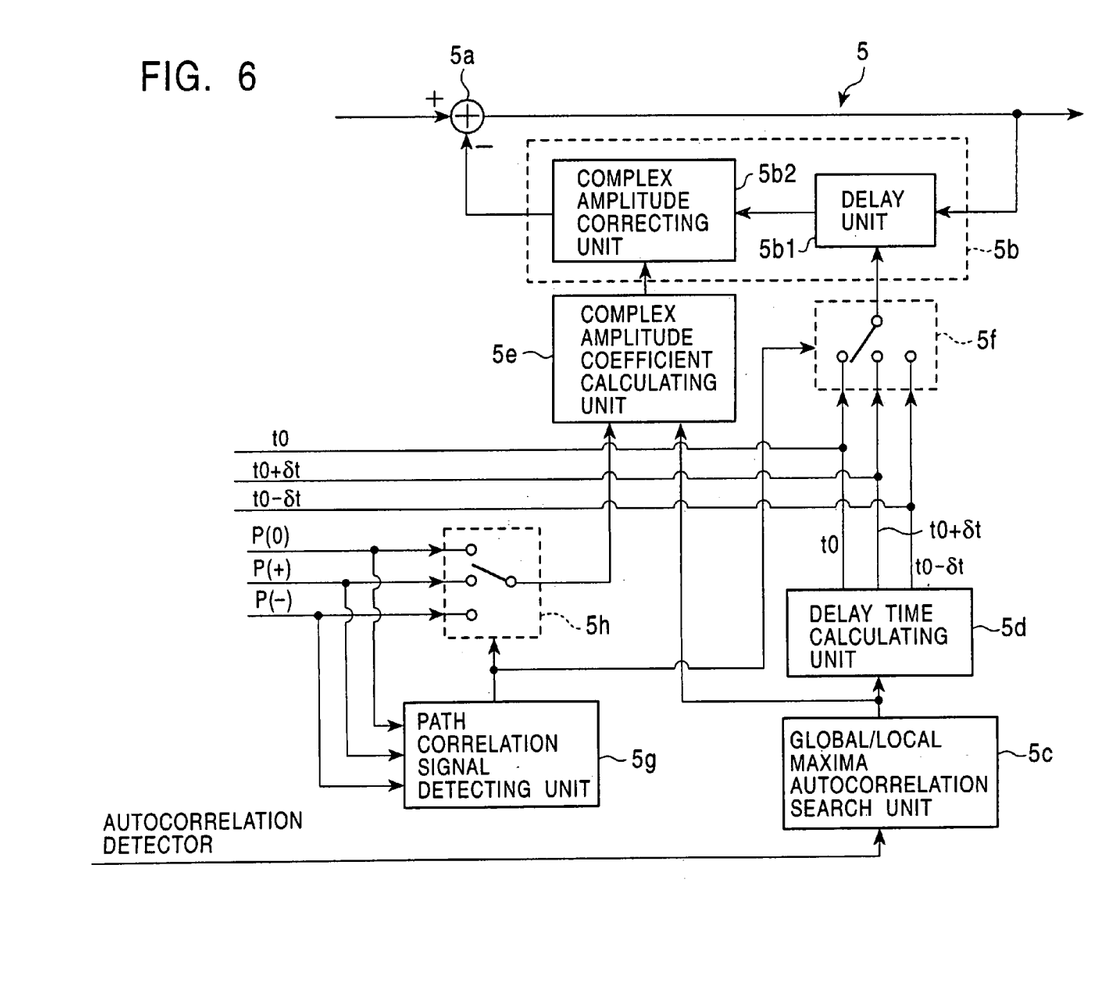
FIG. 6 is a circuit diagram of a delay equalizer in the OFDM receiving apparatus of the present invention.

The structure and operation of an OFDM receiving apparatus of the present invention are now described with reference to FIGS. 1 to 6. FIG. 1 illustrates the overall OFDM receiving apparatus. FIGS. 2 and 3 specifically illustrate an autocorrelation detector and a path correlation detector in the OFDM receiving apparatus shown in FIG. 1, respectively. FIGS. 4 and 5 are waveforms of an autocorrelation signal and a path correlation signal, respectively. FIG. 6 specifically illustrates a delay equalizer in the OFDM receiving apparatus shown in FIG. 1.

An OFDM-modulated signal received by an antenna 1 is amplified and frequency-converted by a receiver 2. The resulting signal is further converted into a pair of digital baseband signals, which stand in orthogonal relation to each other, by an analog-to-digital (A/D) converter (not shown) of the receiver 2. It is assumed herein that the received OFDM signal contains a direct wave directly delivered from a transmission antenna, and a delayed wave delivered after being reflected by an obstruction such as a building, and the converted digital baseband signals also include a direct wave component and a delayed wave component. In the following description, however, the overall digital baseband signals are simply referred to as an "OFDM-modulated signal", unless specifically noted.

The OFDM-modulated signal output from the receiver 2 is input to an autocorrelation detector 3, a plurality of (in this embodiment, three) path correlation detectors 4 (4-1 through 4-3), and a delay equalizer 5.

One transmitted symbol of the OFDM-modulated signal is formed of a guard interval period in which it is tolerant of interference of the delayed waves, and an effective symbol period in which an information signal of interest to be transmitted is inserted.

The autocorrelation detector 3 detects the periodicity of the OFDM-modulated signal. As shown in FIG. 2, the OFDM-modulated signal is input to both an effective symbol time delay unit 3a and a complex conjugate signal generating unit 3b. The effective symbol time delay unit 3a delays the input OFDM-modulated signal by the effective symbol period. The complex conjugate signal generating unit 3b generates a signal (complex conjugate signal) that is the conjugate of the input OFDM-modulated signal (one of the pair of orthogonal digital baseband signals is used as the real part and the other as the imaginary part). The OFDM-modulated signal delayed by the effective symbol time delay unit 3a and the complex conjugate signal generated by the complex conjugate signal generating unit 3b are multiplied by a multiplying unit 3c.

The multiplication results of the multiplying unit 3c are accumulated for a predetermined time by an accumulating unit 3d, and the value obtained as a result of accumulation is an autocotrelation signal that iterates every transmitted symbol. As depicted in FIG. 4, there are two types of autocorrelation signals, i.e., a real-part autocorrelation signal (indicated by I) and an imaginary-part autocorrelation signal (indicated by Q), as described above. The imaginary-part autocorrelation signal is significantly smaller and varies for one transmitted symbol period less than the real-part autocorrelation signal. The real-part autocorrelation signal exhibits some peaks for one transmitted symbol period of the OFDM-modulated signal, which are used to detect the periodicity of the OFDM-modulated signal. An autocorrelation peak (global maximum Ia) that appears first corresponds to the amplitude of the direct wave, and an autocorrelation peak (local maximum Ib) which appears later than the first peak corresponds to the amplitude of the delayed wave. A plurality of delayed waves produce a plurality of local maxima. Since the delayed wave arrives at the antenna 1 later than the direct wave, the delay time of the delayed wave with respect to the direct wave can be found based on the difference between the time when the global maximum appears and the time when the local maximum appears.

The path correlation detector 4 detects the phase difference between the direct wave and the delayed wave which is produced due to the difference in transmission route (path) therebetween. As shown in FIG. 3, the OFDM-modulated signal is input to both a delay time delay unit 4a and a complex conjugate signal generating unit 4b. The delay time delay unit 4a delays the input OFDM-modulated signal by the delay time defined by the delay equalizer 5 for each of the path correlation detectors 4-1 through 4-3. For example, the delay time defined for the path correlation detector 4-1 is delay time t0 obtained based on the autocorrelation signal of the autocorrelation detector 3; the delay time defined for the path correlation detector 4-2 is indicated by t0+δt; the delay time defined for the path correlation detector 4-3 is indicated by t0−δt.

The value δt is described below.

As shown in FIG. 4, the delay time of the delayed wave with respect to the direct wave is determined based on the difference between the time at which the global maximum (Ia) of the autocorrelation signal appears and the time at which the local maximum (Ib) appears subsequently. However, noise superposed on the autocorrelation signal would cause a change of the time at which a low-level local maximum of delayed wave appears. The maximum error τt depends upon the frequency component or amplitude of the superposed noise. It is therefore considered that the true delay time exists in a range of the time at which the local maximum (Ib) appears plus the maximum error τt. In order to determine a path correlation signal at the delay time closest to the true delay time and determine this delay time, the delay time t0 obtained based on the autocorrelation signal, and the delay times (t0+δt and t0−δt) which differ from each other by short time δt are used, where τt≧δt.

By increasing the number of path correlation detectors 4 to further create the delay times defined for the path correlation detectors 4, a more accurate path correlation signal and delay time are determined.

The complex conjugate signal generating unit 4b generates a signal (complex conjugate signal) that is that conjugate of the input OFDM-modulated signal (one of the pair of orthogonal digital baseband signals is used as the real part and the other as the imaginary part). The complex conjugate signal generating unit 4b has the same structure as that of the complex conjugate signal generating unit 3b of the autocorrelation detector 3. The OFDM-modulated signal delayed by the delay time delay unit 4a and the complex conjugate signal generated by the complex conjugate signal generating unit 4b are multiplied by a multiplying unit 4c.

The multiplication results of the multiplying unit 4c are accumulated for a predetermined time by an accumulating unit 4d, and the value obtained as a result of accumulation is a path correlation signal. As depicted in FIG. 5, there are also two types of path correlation signals, i.e., a real-part path correlation signal (indicated by I) and an imaginary-part path correlation signal (indicated by Q). Both the real-part and imaginary-part path correlation signals exhibit a substantially constant path correlation value for one transmitted symbol period such that the arc tangent of mean path correlation value Ip for the real part and mean path correlation value Qp for the imaginary part, i.e., arc tan Qp/Ip, represents the phase difference between the direct wave and the delayed wave.

When the delayed wave contained in the OFDM-modulated signal is delayed longer than the guard interval period (which has been inserted during modulation) in one transmitted symbol, the delay equalizer 5 removes the delayed wave and outputs only the direct wave. The structure of the delay equalizer 5 is shown in FIG. 6. The delay equalizer 5 includes an adding unit 5a having a first input terminal (+) to which the OFDM-modulated signal containing the delayed wave is input, and a feedback unit 5b connected between the output terminal of adding unit 5a and a second input terminal (−) of the adding unit 5a. The feedback unit 5b has a delay unit 5b1 and a complex amplitude correcting unit 5b2.

The delay equalizer 5 further includes a global/local maxima autocorrelation search unit 5c to which the autocorrelation signal is input, and two calculating units, namely, a delay time calculating unit 5d and a complex amplitude coefficient calculating unit 5e, which are connected to the global/local maxima autocorrelation search unit 5c.

The global/local maxima autocorrelation search unit 5c searches for the times T1 and T2 at which the global and local maxima of the input autocorrelation signal appear (the global and local maxima may be the global and local maxima Ia and Ib with respect to the real-part autocorrelation signal, respectively), and sends a signal containing this information to the delay time calculating unit 5d. The delay time calculating unit 5d calculates delay time t0 based on the times T1 and T2, a delay time of t0 plus δt, i.e., t0+δt, and a delay time of t0 minus δt, i.e., t0−δt. The value δt is previously known from the characteristic of noise, and is stored in the delay time calculating unit 5d. The signal containing the delay time information is sent to the above-noted path correlation detectors 4-1 through 4-3 to define the delay times thereof. This signal is also sent to the delay time selecting unit 5f.

The global/local maxima autocorrelation search unit 5c further searches for the global maximum Ia of the real-part autocorrelation signal and the global maximum Qa of the imaginary-part autocorrelation signal (which may be substituted for the mean values thereof), and sends the results to a complex amplitude coefficient calculating unit 5e.

The path correlation signals p(0), p(+), and p(−) output from the path correlation detectors 4-1, 4-2, and 4-3, respectively, are input to both a path correlation signal comparing unit 5g and a path correlation signal selecting unit 5h. The path correlation signal comparing unit 5g compares the vector sums of the mean Ip of the real part and the mean Qp of the imaginary part of the path correlation signals p(0), p(+), and p(−), and controls the path correlation signal selecting unit 5h to select the path correlation signal which produces the largest vector sum. The path correlation signal comparing unit 5g also controls the delay time selecting unit 5f to select the delay time corresponding to the largest path correlation signal. For example, if the path correlation signal p(0) is the largest, the path correlation signal selecting unit 5h selects the path correlation signal p(0) and inputs it to the complex amplitude coefficient calculating unit 5e, and the delay time selecting unit 5f selects designated delay time t0 based on which the path correlation signal p(0) is obtained and inputs it to the delay unit 5b1.

The selection of the largest path correlation signal from a plurality of path correlation signals indicates that the direct wave and the delayed wave have a strong correlation, and a more accurate delay time is therefore determined.

The delay unit 5b1 delays the OFDM-modulated signal output from the adding unit 5a, which substantially includes the direct wave alone with the delayed wave removed therefrom, by the delay time t0 of the delayed wave. The delay unit 5b1 then inputs the result to the complex amplitude correcting unit 5b2. Thus, the direct wave negatively fed back to the adding unit 5a coincides in time with the delayed wave of the OFDM-modulated signal initially input to the adding unit 5a.

The complex amplitude coefficient calculating unit 5e calculates a complex amplitude coefficient based on the path correlation signal p(0) (the real-part path correlation value Ip and the imaginary-part path correlation value Qp), which is input from the path correlation signal selecting unit 5h, and the global/local maxima autocorrelation signals (correlation values Ia and Qa). The complex amplitude correcting unit 5b2 uses the complex amplitude coefficient to correct the complex amplitude of the direct wave output from the delay unit 5b1 so as to coincide with the complex amplitude of the delayed wave of the OFDM-modulated signal input to the adding unit 5a.

Calculation of the complex amplitude coefficient and correction for the complex amplitude are described below. The complex amplitude of the direct wave of the OFDM-modulated signal input to the adding unit 5a is expressed by general formula ($\alpha+j\beta$), and the complex amplitude of the delayed wave is expressed by general formula ($\gamma+j\delta$), where j denotes the imaginary number unit. Correction for the complex amplitude means that the general formula ($\alpha+j\beta$) is transformed into the general formula ($\delta+j\beta$). The complex amplitude of the fed back direct wave is multiplied by the complex amplitude coefficient to modify the signal intensity and phase, which is then transformed into the complex amplitude of the delayed wave.

More specifically, the general formula of the complex amplitude coefficient is expressed by (a+jb), in which the real part "a" denotes a first correction coefficient and the imaginary part "b" denotes a second correction coefficient. Then, the complex amplitude of the delayed wave is expressed by Equation (1), and the complex amplitude coefficient is defined as Equation (2):

$$\gamma + j\delta = (a + jb)(\alpha + j\beta) \tag{1}$$

$$a + jb = \frac{\gamma + j\delta}{\alpha + j\beta} \tag{2}$$

Therefore, the complex amplitude coefficient is expressed as the ratio of the complex amplitude of the delayed wave to the complex amplitude of the direct wave.

Since the relation does not change if the denominator and numerator of Equation (2) are multiplied by the same value, both the denominator and the numerator are multiplied by complex conjugate (α+jβ) in order to derive the relation with the four correlation values Ia, Qa, Ip, and Qp. Then, the complex amplitude coefficient is transformed into the following equation:

$$a + jb = \frac{(\gamma + j\delta)(\alpha - j\beta)}{\alpha^2 + \beta^2} \quad (3)$$

The denominator of Equation (3) indicates the power of the direct wave, which is proportional to the global maximum autocorrelation. The numerator of Equation (3) indicates the correlated power between the direct wave and the delayed wave, which is proportional to the path correlation value. From this relationship, the complex amplitude coefficient is determined by making the numerator of Equation (3) correspond to value (Ip+jQp), which is a complex representation of the mean values (Ip, Qp) of the path correlation signal output from the path correlation detector 4, and by making the denominator of Equation (3) correspond to value (Ia+jQa), which is a complex representation of the global maxima (Ia, Qa) of the autocorrelation signal output from the global/local maxima search unit 5c.

Specifically, the complex amplitude coefficient (a+ jb) is expressed by Equation (4) in which the real part "a" and the imaginary part "b" are found by Equations (5) and (6), respectively, using known arithmetic calculation:

$$a + jb = \frac{Ip + jQp}{Ia + jQa} \quad (4)$$

$$a = \frac{Ia \cdot Ip + Qa \cdot Qp}{Ia^2 + Qa^2} \quad (5)$$

$$b = \frac{Ia \cdot Qp - Ip \cdot Qa}{Ia^2 + Qa^2} \quad (6)$$

Accordingly, the complex amplitude coefficient obtained using both the global maxima of the autocorrelation signal and the mean values of the path correlation signal can be used to transform the complex amplitude (α+jβ) of the negatively fed back direct wave into the complex amplitude (γ+jδ) of the input delayed wave. This enables the delayed wave to be completely cancelled or removed in the adding unit 5a.

What is claimed is:

1. An OFDM receiving apparatus comprising:
   delay equalizing means including adding means to which an OFDM-modulated signal including a direct wave and a delayed wave is input and feedback means for delaying the direct wave output from the adding means and for negatively feeding back to the adding means the delayed direct wave so as to remove the delayed wave;
   autocorrelation detecting means for detecting the amplitude of the direct wave and the amplitude of the delayed wave and for detecting the time at which each of the amplitudes becomes the local maximum; and
   a plurality of path correlation detecting means for delaying the input OFDM-modulated signal by different periods to detect a path correlation value indicating a phase difference between the direct wave and the delayed wave,
   wherein said delay equalizing means further includes delay time calculating means for calculating a plurality of delay times which differ from each other by short time periods based on the times at which the amplitudes of the direct wave and the delayed wave become the local maximum, the plurality of delay times including the delay time of the delayed wave with respect to the direct wave, so as to delay the OFDM-modulated signal input to said plurality of path correlation detecting means by the plurality of delay times, and said feedback means causes the amplitude and phase of the negatively fed back direct wave to coincide with the amplitude and phase of the delayed wave input to the adding means based on the largest path correlation value of the path correlation values so as to delay the negatively fed back direct wave by a designated delay time based on which the largest path correlation value is determined.

2. An OFDM receiving apparatus according to claim 1, wherein said delay equalizing means further includes path correlation signal comparing means for comparing the path correlation values, path correlation signal selecting means for selecting a path correlation signal corresponding to the largest path correlation value, and time delay selecting means for selecting the designated delay time; and the path correlation signal comparing means controls the selection of the path correlation signal selecting means and the delay time selecting means.

3. An OFDM receiving apparatus according to claim 1, wherein said feedback means includes complex amplitude correcting means for performing correction so that the amplitude and phase of the negatively fed back direct wave coincide with the amplitude and phase of the delayed wave input to the adding means, and delay means for feeding back the negatively fed back direct wave by the designated delay time based on which the largest path correlation value is determined.

4. An OFDM receiving apparatus according to claim 1, wherein the selected path correlation signal is input to said delay equalizing means, and said delay equalizing means further includes complex amplitude coefficient calculating means for causing the amplitude and phase of the negatively fed back direct wave to coincide with the amplitude and phase of the delayed wave input to the adding means based on the amplitudes and the times.

* * * * *